US010783776B2

(12) United States Patent
Hassani et al.

(10) Patent No.: US 10,783,776 B2
(45) Date of Patent: Sep. 22, 2020

(54) DRONE-BASED EVENT RECONSTRUCTION (71) Applicant: Ford Global Technologies, LLC, Dearborn, MI (US)

(72) Inventors: ALi Hassani, Ann Arbor, MI (US); Alexandra Taylor, Harbor Springs, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 15/999,445

(22) Filed: Aug. 20, 2018

(65) Prior Publication Data

US 2020/0058219 A1 Feb. 20, 2020

(51) Int. Cl.
G08G 1/01 (2006.01)
G06Q 40/08 (2012.01)
B64C 39/02 (2006.01)

(52) U.S. Cl.
CPC ......... *G08G 1/0133* (2013.01); *B64C 39/024* (2013.01); *G06Q 40/08* (2013.01); *G08G 1/012* (2013.01); *B64C 2201/127* (2013.01)

(58) Field of Classification Search
CPC .... G08G 1/0133; G08G 1/012; B64C 39/024; B64C 2201/127; G06Q 40/08
See application file for complete search history.

(56) References Cited

U.S. PATENT DOCUMENTS

| | | | | |
|---|---|---|---|---|
| 9,505,494 | B1* | 11/2016 | Marlow | B64C 39/024 |
| 10,102,586 | B1* | 10/2018 | Marlow | G06Q 40/08 |
| 10,145,684 | B1* | 12/2018 | Tofte | B64D 47/08 |
| 10,223,753 | B1* | 3/2019 | Marlow | B64C 39/024 |
| 2016/0063642 | A1 | 3/2016 | Luciani et al. | |
| 2016/0236638 | A1 | 8/2016 | Lavie et al. | |
| 2016/0240020 | A1 | 8/2016 | Tang | |
| 2016/0295089 | A1 | 10/2016 | Farahani | |
| 2018/0322749 | A1* | 11/2018 | Kempel | G08B 13/1965 |
| 2019/0227555 | A1* | 7/2019 | Sun | B64C 39/024 |

FOREIGN PATENT DOCUMENTS

GB 2551682 A 1/2018

OTHER PUBLICATIONS

How Drones are Changing Accident Reconstruction—For the Better. Published Sep. 13, 2016. https://nealefhima.com/drones-changing-accident-reconstruction-better/.

* cited by examiner

Primary Examiner — Russell Frejd
(74) Attorney, Agent, or Firm — Brandon Hicks; Eversheds Sutherland (US) LLP (57) ABSTRACT A method is disclosed for providing drone oversight at a location having high potential for a collision event. The method may include recruiting one or more drones to provide oversight at a location having high potential for a collision event, and dispatching the drones to the location. One or more servers may request from the drones buffers of sensory data corresponding to the location. In response, the servers may receive from the drones the buffers of sensory data. A corresponding system and computer program product are also disclosed and claimed herein.

20 Claims, 6 Drawing Sheets

DRONE-BASED EVENT RECONSTRUCTION

BACKGROUND

Field

This disclosure relates to event monitoring and reporting.

Background

While car accidents are always unexpected and often traumatic events, deliberate documentation of evidence following an accident is critical for purposes of supporting and/or defending related claims. Insurance companies and courts alike rely heavily on documentation from the accident scene, and accident reconstruction based on such documentation, to decide fault and determine damages. For this reason, taking pictures or even video at the scene of an accident, even by amateurs, is highly recommended to ensure that every detail is properly recorded.

Currently, the most common techniques that professional accident responders employ to document an accident scene utilize a combination of laser scanners, total stations, and photography. In this manner, such responders may gather data and generate a 3D point cloud of the site and accident with reliable accuracy. Such techniques, however, require a large amount of time and knowledge by those who perform the documentation.

Unmanned aerial vehicles, otherwise known as drones, are powered, aerial vehicles that do not carry human operators, use aerodynamic forces to provide vehicle lift, can fly autonomously or be piloted remotely, can be expendable or recoverable, and can carry a payload. While originally utilized for military applications, drones are quickly expanding to commercial, scientific, recreational, agricultural, and other applications. Drones also have the potential to revolutionize traditional documentation techniques due to their aerial vantage points, as well as their ability to circumvent traffic and other land-based obstacles and cover larger distances for faster coverage.

In view of the foregoing, what are needed are systems and methods to harvest sensory data from drones in the event of a vehicle collision. Ideally, such systems and methods would utilize crowdsourcing to recruit drones to monitor scenarios with a high potential for collisions. Such systems and methods would also be able to request event reconstruction data from drones and vehicles within a certain range following a collision.

BRIEF DESCRIPTION OF THE DRAWINGS

In order that the advantages of the disclosure will be readily understood, a more particular description of the disclosure will be rendered by reference to specific embodiments illustrated in the appended drawings. These drawings depict only typical embodiments of the disclosure and therefore should not be considered as limiting its scope. The disclosure will be described and explained with additional specificity and detail through use of the accompanying drawings, in which.

DETAILED DESCRIPTION

Figure 1:
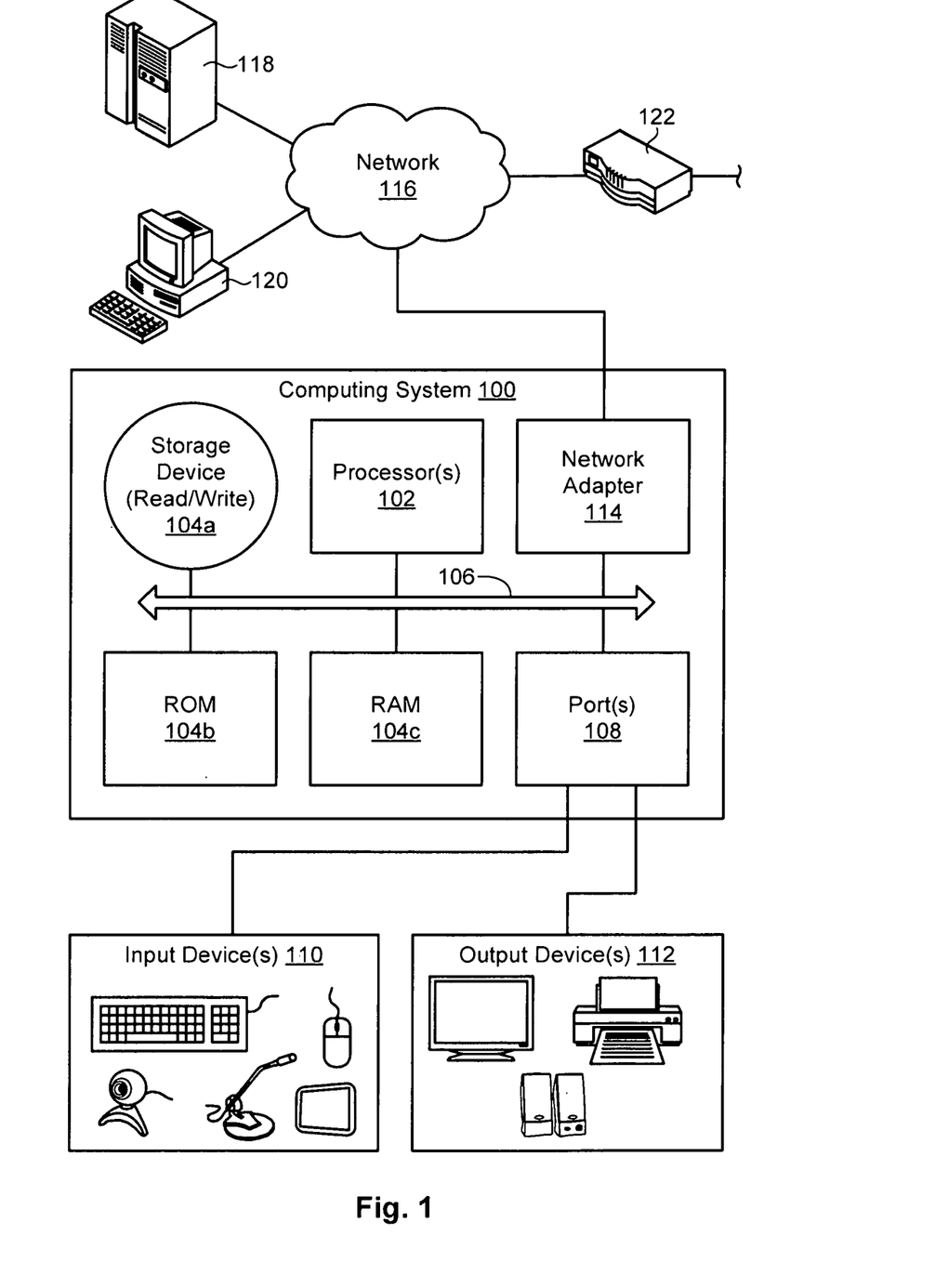
FIG. 1 is a high-level block diagram showing one example of a computing system in which a system and method may be implemented in accordance with certain embodiments of the disclosure.

Referring to FIG. 1, one example of a computing system 100 is illustrated. The computing system 100 is presented to show one example of an environment where a system and method may be implemented in accordance with the disclosure. The computing system 100 may be embodied as a mobile device such as a smart phone or tablet, a desktop computer, a workstation, a server, or the like. The computing system 100 is presented by way of example and is not intended to be limiting. Indeed, the systems and methods disclosed herein may be applicable to a wide variety of different computing systems in addition to the computing system 100 shown. The systems and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices 104a such as hard drives, solid state drives, CD-ROM drives, DVD-ROM drives, tape drives, or the like. The memory 104 may also include non-volatile memory such as a read-only memory 104b (e.g., ROM, EPROM, EEPROM, and/or flash ROM) or volatile memory such as a random access memory 104c (RAM or operational memory). A bus 106, or plurality of buses 106, may interconnect the processor 102, the memory devices 104, and other devices to enable data and/or instructions to pass therebetween.

To enable communication with external systems or devices, the computing system 100 may include one or more ports 108. Such ports 108 may be embodied as wired ports (e.g., USB ports, serial ports, Firewire ports, SCSI ports, parallel ports, etc.) or wireless ports (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a wired or wireless network adapter 114 to connect the computing system 100 to a network 116, such as a LAN, WAN, or the Internet. Such a network 116 may enable the computing system 100 to connect to one or more servers 118, workstations or personal computers 120, mobile computing devices, or other devices. The network 116 may also enable the computing system 100 to connect to another network by way of a router 122 or other device. Such a router 122 may allow the computing system 100 to communicate with servers, workstations, personal computers, or other devices located on different networks.

As previously mentioned, accident and event reconstruction is usually performed as a matter of course to provide evidence and documentation that may be relied on to substantiate insurance and/or legal claims. Modern accident reconstruction techniques provide accurate and reliable data when performed properly. However, such techniques require a high level of knowledge and skill to perform them, in addition to a substantial amount of time. As a result, the costs associated with modern accident reconstruction techniques may be substantial and often prohibitive, since the primary goal of most accident responders is to remove any traffic impediment as quickly as possible.

As set forth herein, embodiments of the present disclosure may utilize drones to provide a cost-efficient solution to the problems associated with current accident and event reconstruction techniques, while ensuring high levels of accuracy and reliability. In addition, embodiments of the disclosure may provide additional advantages over current accident and event reconstruction techniques by enabling quick deployment and oversight in hard-to-reach locations, and an ability to document an entire crash scene at once via an aerial vantage point.

As used herein, the term "drone" refers to any unmanned aerial vehicle (UAV) having at least one sensor coupled thereto.

Figure 2:
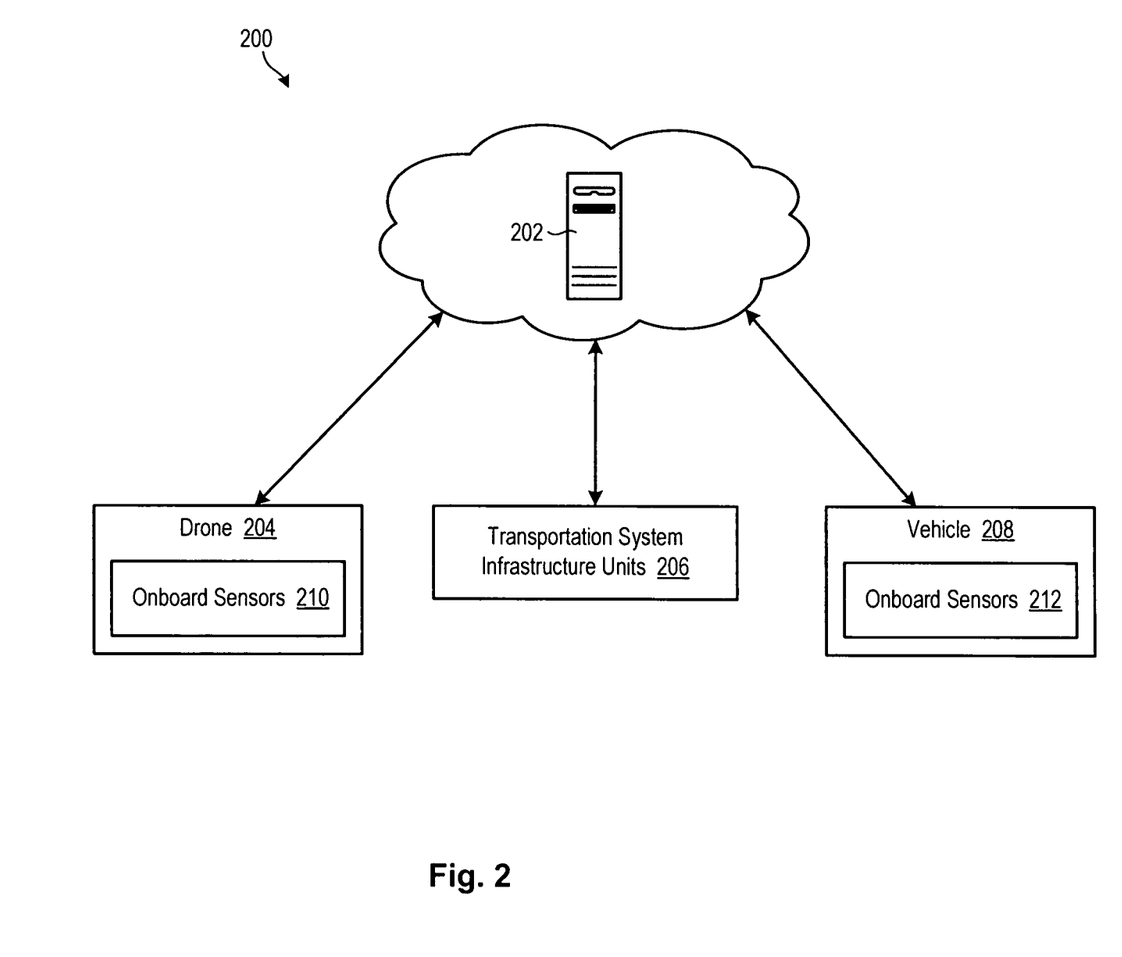
FIG. 2 is a high-level block diagram showing components of a system for drone-based event reconstruction in accordance with certain embodiments of the disclosure.

Referring now to FIG. 2, a system 200 for drone-based accident and event reconstruction in accordance with the disclosure may include drones 204, transportation system infrastructure units 206, and vehicles 208. Each of these components may communicate with a remotely located crowdsourcing server or processor, such as a cloud-based crowdsourcing server 202.

The crowdsourcing server 202 may be configured to receive wireless communications from the drones 204, the transportation system infrastructure units 206, and the vehicles 208 by way of an appropriate wireless communications technology, such as a Wi-Fi connection, a cellular data connection, the internet, or other communication technology known to those in the art. Additionally, in some embodiments, one or more the drones 204 and/or the vehicles 208 may communicate with each other utilizing vehicle-to-vehicle (V2V) communication or other short-range communication technology.

In certain embodiments, the crowdsourcing server 202 may display system 200 information on a user interface associated with a mobile device, such as a smart phone or tablet, a desktop computer, a workstation, a local server, a dashboard of a vehicle 208, or the like. In some embodiments, the user interface may enable a user to selectively activate the system 200 or monitor activity of the components of the system 200, such as the drones 204, the transportation system infrastructure units 206, and/or the vehicles 208. In certain embodiments, a user may activate the system 200 by way of a physical button, a virtual button on a screen, a voice command, a mouse click, a finger touch, or the like.

A drone 204 in accordance with embodiments of the disclosure may include an array of onboard sensors 210 such that the drone 204 may sense an external environment from aerial vantage points. Onboard sensors 210 may include, for example, camera sensors, lidar sensors, radar sensors, location or GPS sensors, ultrasound sensors, and the like. Information gathered from the various sensors 210 may be recorded and/or stored in a storage device coupled to or associated with the drone 204, such as a rolling buffer.

In certain embodiments, as discussed in more detail below, information from the onboard sensors 210 may be stored in the buffer and wirelessly communicated to the crowdsourcing server 202 upon request. For example, a geo-fenced request may be sent from the crowdsourcing server 202 when a collision occurs. The drones 204 within the geo-fenced area may upload to the crowdsourcing server 202 onboard sensor 210 data recorded prior to, during, and after the collision. In one embodiment, the uploaded onboard sensor 210 data may include a rolling buffer, capturing the vehicles involved for a period of time before and after the collision. In addition, the drone 204 may update the crowdsourcing server 202 continuously with location or GPS information, such that the crowdsourcing server 202 may be informed in real time regarding a current location of the drone 204.

In one embodiment, for example, the system 200 may recruit one or more drones 204 to provide oversight of the vehicles 208 in high-risk conditions. The system 200 may incentivize drone 204 participation through a subscription package, where the drone 204 owner is paid a fee in exchange for being available to provide drone 204 oversight when requested. The fee may be paid monthly, annually, or on any other periodic or recurring basis. Alternatively, the fee may be a fixed fee or a non-monetary reward.

In other embodiments, the drone 204 owner may be compensated directly for data requested from the crowdsourcing server 202. In certain embodiments, the fee may be paid by the vehicle 208 owners subscribed to the system 200, by usage-based insurance companies, by automobile companies desiring to perform data analytics on driver assist features, or by any other party desiring drone-based information as described herein.

Once enrolled in the system 200, the drone 204 may continuously or periodically communicate its location to the crowdsourcing server 202. Additionally, the drone 204 may retain a rolling buffer of sensory data gathered from the onboard sensors 210. The sensory data buffer may be deactivated to conserve power where the drone 204 is a predetermined distance away from roads or high-risk scenarios. Otherwise, the drone 204 may be "on call" to provide oversight upon request from the crowdsourcing server 202.

The vehicles 208 in accordance with embodiments of the disclosure may also include one or more arrays of onboard sensors 212. The vehicles 208 may also be enrolled in the system 200 and may continuously maintain a short buffer of sensory data, including video and image data, while on the road. The onboard sensors 212 may include, for example, camera sensors, lidar sensors, radar sensors, location or GPS sensors, ultrasound sensors, and other sensors known to those in the art to sense surrounding environmental conditions. In certain embodiments, the onboard sensors 212 may further sense a vehicle's operating conditions such as steering data, throttle position data, chassis acceleration data, and the like. The vehicles 208 may be configured to wirelessly communicate onboard sensor 212 data to the crowdsourcing server 202, the other vehicles 208, and/or the drones 204.

The transportation system infrastructure units 206 may be located substantially adjacent to a roadway and may include sensors, such as video cameras, mounted thereto. The transportation system infrastructure units 206 may also be configured to transmit sensor data to the crowdsourcing server 202, the other vehicles 208, and/or the drones 204 in accordance with embodiments of the disclosure.

Figure 3:
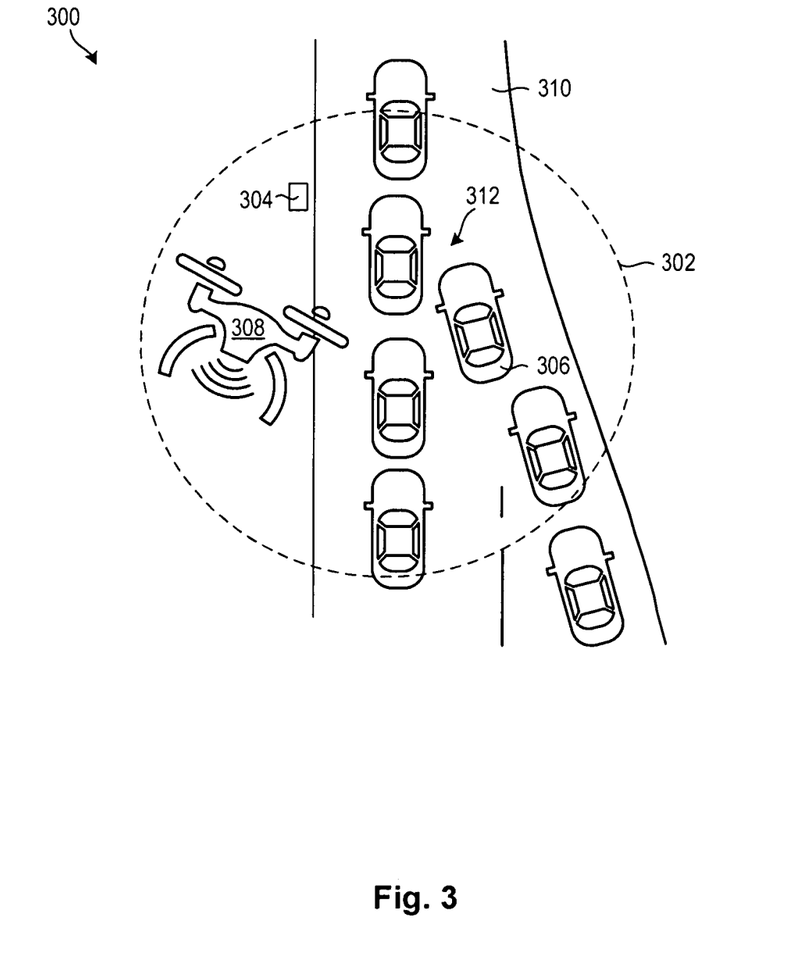
FIG. 3 is a high-level schematic diagram showing drone oversight in a high-risk situation in accordance with certain embodiments of the disclosure.

Referring now to FIG. 3, in some embodiments of the disclosure, a system 300 for drone-based event reconstruction may recruit drones 308 to provide vehicle 306 oversight in high-risk situations. As mentioned above, such drones 308 may be incentivized to provide this service. In any case, high-risk situations, or scenarios known to have a high potential for vehicle 306 collisions, may be determined based on road 310 conditions such as traffic, lack of visibility, lack of traction, and/or other metrics that are tracked by weather and GPS services, delivery drones, defense drones, and the like.

In some embodiments, high-risk situations may also be based on sensory data gathered from onboard the vehicle 306 sensors. For example, many modern vehicles 306 include side and rear radars in addition to front radars. Collision warnings may thus be detected from all angles of the vehicle 306. The vehicle 306 risk may be evaluated by an onboard driver assist or autonomous driving system, which may notify the crowdsourcing server 202 any time the vehicle 306 detects a high probability of collision, or road 310 conditions are deemed risky. In response, the crowdsourcing server 202 may request that the drones 308 within a few miles of the reporting vehicle 306 adapt their route to provide oversight at the high-risk location 312.

As shown, for example, a high-risk situation may include traffic congestion resulting from numerous vehicles 306 attempting to merge onto a one-lane road 310 during rush hour. Sensors associated with a transportation system infrastructure unit 304 adjacent to the road 310 may detect multiple slow-moving vehicles 306 at the point of merge, and may upload that information to the crowdsourcing server 202. Sensors associated with one or more of the merging vehicles 306 may also detect traffic congestion at the location 312 and may upload that information to the crowdsourcing server 202. In some embodiments, the crowdsourcing server 202 may also receive information from GPS services, news services, delivery drones, defense drones, or the like, indicating a high-risk situation at the location 312 due to traffic congestion.

The crowdsourcing server 202 may combine the information received from such various sources into one triggering event based on probabilistic modeling, and may analyze the triggering event to determine the occurrence of a high-risk situation. In one embodiment, the crowdsourcing server 202 may predict, based on historical information for the date, time, and/or location 312, a high-risk situation prior to or in addition to receiving direct information from one or various sources indicating a triggering event. In any event, the crowdsourcing server 202 may then dispatch one or more drones 308 to the location 312 to provide oversight accordingly.

In some embodiments, the crowdsourcing server 202 may determine a geo-fenced region 302 including the location 312. The vehicles 306, the drones 308, and/or the transportation system infrastructure units 304 within the geo-fenced region 302, or a predetermined area surrounding the location 312 of the triggering event, may be notified of the event by the crowdsourcing server 202. Such vehicles 306, drones 308 and/or transportation system infrastructure units 304 may respond by uploading their sensor data recorded at the time of the triggering event, and for a short period of time preceding and following the event. The crowdsourcing server 202 may associate the uploaded data with the triggering event and may analyze the data for purposes of event reconstruction.

Figure 4:
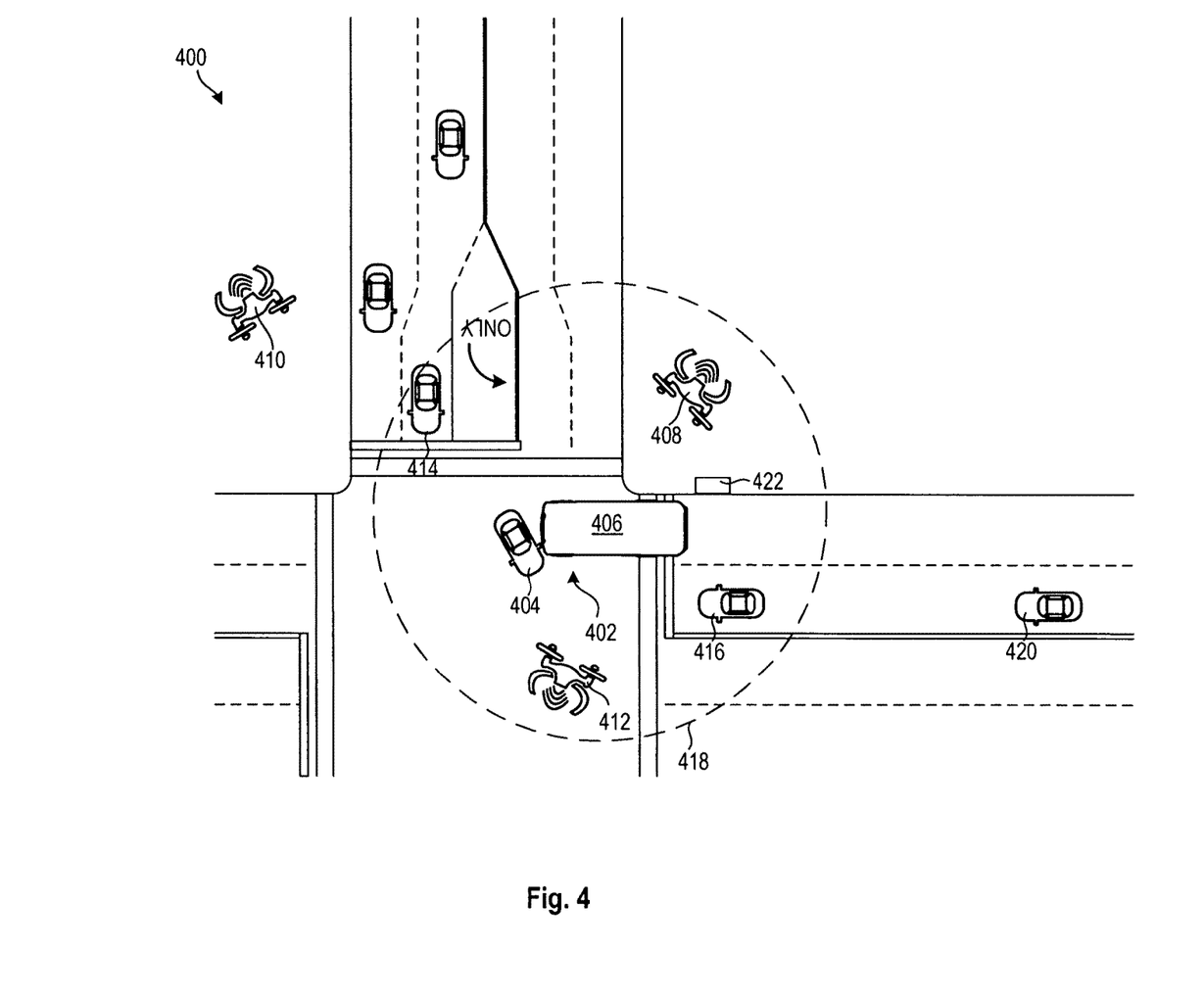
FIG. 4 is a high-level schematic diagram showing drone oversight of a collision event in accordance with certain embodiments of the disclosure.

Referring now to FIG. 4, in some embodiments, a system 400 in accordance with the disclosure may be triggered by a vehicle collision 402 involving one or more vehicles. As shown, sensors onboard or otherwise associated with a first vehicle 404 may detect an impact event with a second vehicle 406. The impact event may trigger the first vehicle 404 to communicate sensor data surrounding the moment of impact to a crowdsourcing server 202. Sensor data from the first vehicle 404 may include, for example, notification that the first vehicle 404 has been involved in a collision 402, the GPS location, the time of impact, the state of the external environment at impact, the operating conditions at impact, and the like. In some embodiments, sensors associated with the second vehicle 406 may also detect the impact event and may trigger the second vehicle 406 to empty its buffer of sensory data to the crowdsourcing server 202 as well. The crowdsourcing server 202 may compile information from the first vehicle 404 and the second vehicle 406 based on at least the location and time information received from each, and may associate such information with the impact event.

In some embodiments, high impact events may include any event where the vehicle 404 airbags are deployed, such as rollovers, collisions, impact with a foreign object, and the like. In certain embodiments, non-vehicle events may also trigger proximately located drones 408, 412 and vehicles 404, 406, 414, 416 to upload sensor data to the crowdsourcing server 202. For example, defense and homeland security events, criminal events involving a gunshot or security alarm, traffic violations, and the like, may also trigger surrounding drones 408, 412 and vehicles 404, 406, 414, 416 to upload sensor data to the crowdsourcing server 202.

Upon receiving notification of the event including the location of the collision 402, the crowdsourcing server 202 may determine a geo-fenced region 418 having predetermined dimensions or a predetermined radius surrounding the location of the collision 402. The crowdsourcing server 202 may activate the system 400 to recruit at least one drone 408, 412 to the location of the collision 402, and to request a buffer of sensory data from each of the drones 408, 412 and other vehicles 414, 416 that may be within the geo-fenced region 418. In response, the drones 408, 412 and other vehicles 414, 416 may store locally a buffer of sensory data that corresponds to a duration of time preceding, including, and following the event. The drones 408, 412 and other vehicles 414, 416 may empty their stored buffers to the crowdsourcing server 202 contemporaneously, or at a later time.

In one embodiment, the impact may also trigger the first vehicle 404 to broadcast an alert flag to the crowdsourcing server 202 as well as to the drones 408, 410, 412, the other vehicles 414, 416, 420, and the transportation system infrastructure units 422 in the vicinity. The alert flag may be broadcast to all receiving components within range of the wireless or vehicle communication technology (V2V) or other communication technology known to those in the art, or may be indirectly broadcast via the crowdsourcing server 202. In any case, the alert flag may alert the drones 408, 410, 412, the vehicles 414, 416, 420, and the transportation system infrastructure units 422 that a triggering event has occurred, and may trigger the receiving drones 408, 410, 412, the vehicles 414, 416, 420, and the transportation system infrastructure units 422 to store their respective buffers of sensory data surrounding the moment of impact. In some embodiments, the alert flag may also trigger the receiving drones 408, 410, 412, the vehicles 414, 416, 420, and the transportation system infrastructure units 422 to upload their respective buffers to the crowdsourcing server 202.

Such buffers may include sensory data including all accessible image data (i.e., camera, radar, ultrasonic), as well as any optional data the receiving component may be configured to include, such as its own GPS location and speed. All files from a given event may be uploaded to the crowdsourcing server 202 by cellular or other communication technology, and may be stored in the same location on the crowdsourcing server 202. In some embodiments, a user may receive notification from the crowdsourcing server 202 with information regarding how to access such files.

In certain embodiments, some vehicles 420 and/or drones 410 outside of the geo-fenced region 418 may receive the alert flag broadcast by the first vehicle 404. In this case, the receiving vehicle 420 or drone 410 may ignore the alert flag and not store or upload its buffer of sensory data to the crowdsourcing server 202.

Figure 5:
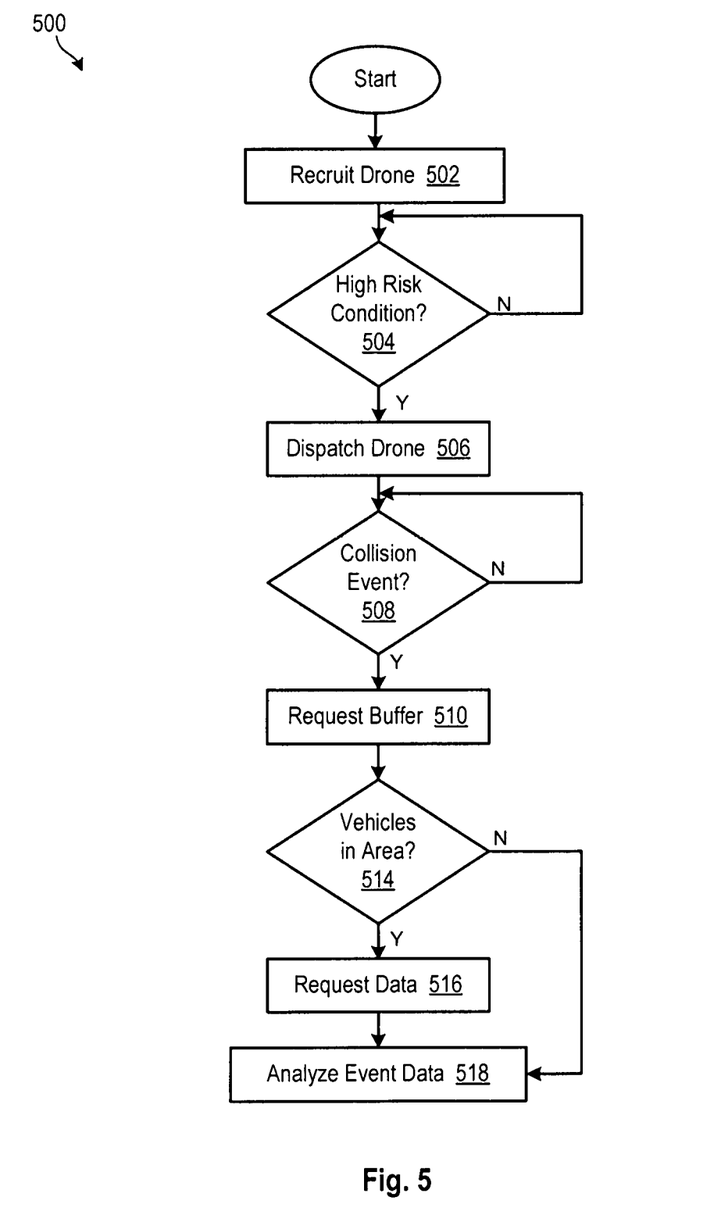
FIG. 5 is a flow chart showing a process for drone-based event reconstruction in accordance with certain embodiments of the disclosure.

Referring now to FIG. 5, a method 500 for drone-based event reconstruction in accordance with the present disclosure may include recruiting 502 at least one drone to provide drone oversight upon request. Recruiting 502 a drone may include, for example, incentivizing a drone owner to participate in a drone oversight program in exchange for financial or other reward-based compensation. The method 500 may then query 504 whether a high-risk condition exists at a particular location. A high-risk condition may be any condition where there is a high probability of a collision occurring including, for example, dangerous or adverse road conditions, bad weather, traffic congestion, road construction, vehicle system warnings, or the like.

If no high-risk condition exists, the method 500 may continue to query 504 for high risk conditions. If a high risk condition exists, a drone may be dispatched 506 to a location corresponding thereto. In some embodiments, the drone may be dispatched by a remotely located server or processor, such as a cloud-based crowdsourcing server.

The method 500 may detect 508 whether a collision event has occurred at the location. In certain embodiments, sensors associated with one or more of the dispatched drones may gather data at the location, which may be stored on a circular or rolling buffer. When a collision occurs, a vehicle involved in the collision may broadcast an alert flag to the drone, which may trigger the drone to upload relevant data corresponding to the location to the crowdsourcing server. Alternatively, the server may be notified of the collision by the involved vehicle or by another vehicle, by a transportation system infrastructure unit, by a drone, or by another information source in the vicinity. The server may then request 510 the buffer from the drone.

In some embodiments, the method 500 may further query 514 whether there are connected vehicles in the immediate vicinity that may also have gathered sensory data relevant to the collision event. If so, such relevant sensory data may be requested 516 from the one or more vehicles by a crowdsourcing or other remotely-located server, and may be compiled with other relevant data received from the drones or other sources. The compiled data may then be analyzed 518 to reconstruct the event for purposes of determining fault and/or damages. If not, the method 500 may directly analyze 518 the relevant sensory data from the drones or other sources. In certain embodiments, the crowdsourcing or other remotely located server may perform the analysis 518 and provide access to a user.

In some embodiments, for example, camera or other image data may be used to visually recreate the scene, while additional data from radar and ultrasonic sensors may be used to estimate the relative velocity of the affected or involved vehicles. A user may obtain access to the analysis 518 and, in some embodiments, the data set, for insurance, liability, or other purposes without needing to request speed and GPS data directly from each vehicle.

Figure 6:
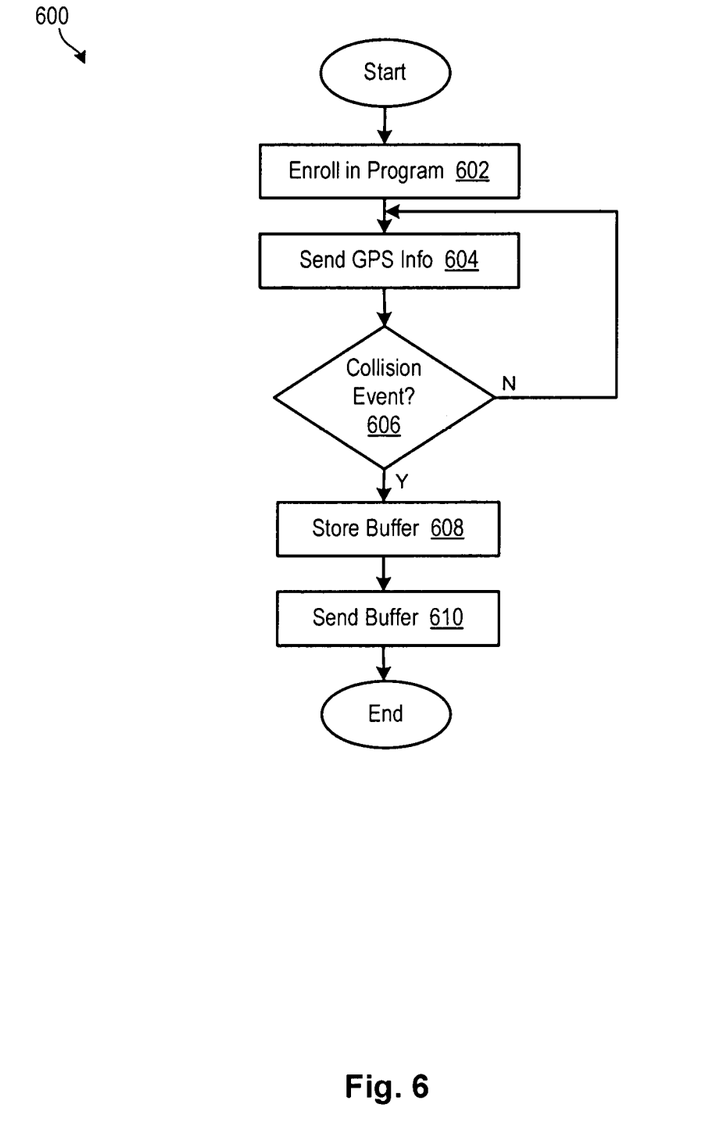
FIG. 6 is a flow chart showing a process for utilizing a drone to record an event in accordance with certain embodiments of the disclosure.

Referring now to FIG. 6, a process 600 for utilizing a drone to record an event in accordance with embodiments of the disclosure may include enrolling 602 a drone or a drone owner in an event monitoring program to provide drone oversight upon request. In certain embodiments, the drone owner may be incentivized to participate in the event monitoring program by receiving financial or other reward-based compensation in exchange for making the drone available as needed, or during predetermined time periods. Upon enrollment, the drone may send 604 continuous, intermittent, or periodic GPS or location updates to a remotely located crowdsourcing server. In some embodiments, the drone may be specifically dispatched to a location where there is a high risk of vehicle collisions.

In the event of a vehicle collision 606, the drone may receive a request to store 608 a buffer of its relevant sensory data. In response, the drone may store 608 a buffer of the sensory data corresponding to a time period preceding, during, and after the time of the collision event. The drone may then send 610 the buffer to the requestor for further storage and/or analysis.

In the above disclosure, reference has been made to the accompanying drawings, which form a part hereof, and which illustrate specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, a special purpose computer, or a special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, the functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

EXAMPLES

In some instances, the following examples may be implemented together or separately by the systems and methods described herein.

Example 1 may include a method, comprising: determining, by at least one server, a drone to provide oversight at a location having high potential for a collision event; dispatching, by the at least one server, the drone to the location; requesting, by the at least one server, sensory data from the drone; and receiving, by the at least one server, the sensory data from the drone.

Example 2 may include the method of example 1 and/or some other example herein, wherein the sensory data is stored in a buffer of the drone.

Example 3 may include the method of example 2 and/or some other example herein, wherein the request for the sensory data is based on a first collision event.

Example 4 may include the method of example 3 and/or some other example herein wherein the buffer comprises sensory data corresponding to a predetermined time beginning before and ending after the first collision event.

Example 5 may include the method of example 1 and/or some other example herein, wherein the sensory data comprises at least one of image data, lidar data, radar data, GPS data, or ultrasound data.

Example 6 may include the method of example 1 and/or some other example herein, further comprising receiving, by the at least one server, a request for drone oversight at the location.

Example 7 may include the method of example 6 and/or some other example herein, wherein the request is based on at least one of traffic congestion, adverse road conditions, or vehicle system warnings.

Example 8 may include the method of example 1 and/or some other example herein, wherein the sensory data is based on a rolling buffer of sensory data.

Example 9 may include the method of example 1 and/or some other example herein, wherein the drone is provided with an incentive to enroll in an event monitoring program.

Example 10 may include the method of example 9 and/or some other example herein, wherein the at least one server continuously communicates with the drone after the drone enrolls in the event monitoring program.

Example 11 may include a system, comprising: at least one processor; and at least one memory operably coupled to the at least one processor and storing instructions for execution on the at least one processor, the instructions causing the at least one processor to: determine at least one drone to provide oversight at a location having high potential for a collision event; dispatch the at least one drone to the location; request sensory data from the at least one drone; and receive the sensory data from the drone.

Example 12 may include the system of example 11 and/or some other example herein, wherein the sensory data is stored in a buffer of the at least one drone.

Example 13 may include the system of example 11 and/or some other example herein, wherein the sensory data comprises at least one of image data, lidar data, radar data, GPS data, or ultrasound data.

Example 14 may include the system of example 11 and/or some other example herein, wherein the instructions further cause the processor to receive a request for drone oversight at the location.

Example 15 may include the system of example 14 and/or some other example herein, wherein the request is based on at least one of traffic congestion, adverse road conditions, or vehicle system warnings.

Example 16 may include the system of example 11 and/or some other example herein, wherein the at least one drone is provided with an inventive to enroll in an event monitoring program.

Example 17 may include the system of example 16 and/or some other example herein, wherein the instructions further cause the processor to continuously communicate with the at least one drone after the at least one drone enrolls in the event monitoring program.

Example 18 may include the system of example 11 and/or some other example herein, wherein the instructions further cause the processor to receive from the at least one drone a GPS location corresponding thereto.

Example 19 may include a computer program product comprising a computer-readable storage medium having computer-usable program code embodied therein, wherein the computer-usable program code is configured to perform the following when executed by at least one server: determine a geo-fenced region about a location having a collision event; recruit at least one drone within the geo-fenced region to provide oversight at the location; request, from the at least one drone, sensory data corresponding to the location before, during, or after the collision event; and receive, from the at least one drone, the sensory data.

Example 20 may include the computer program product of example 19 and/or some other example here, wherein the sensory data is stored in a buffer of the at least one drone.

The invention claimed is:

1. A method, comprising:
receiving, by a server and from a vehicle at a location, an indication that the location is associated with a high-risk for a vehicle collision, the indication based on sensory data of the vehicle at the location;
determining, by the server and based on the determination that the location is associated with a high risk for a vehicle collision, a drone to provide oversight at the location;
dispatching, by the server, the drone to the location;
requesting, by the server, sensory data from the drone in the location; and
receiving, by the server, the sensory data from the drone.

2. The method of claim 1, wherein the request for the sensory data is based on a first collision event.

3. The method of claim 2, wherein the sensory data is stored in a buffer of the drone, and wherein the buffer comprises sensory data corresponding to a predetermined time beginning before and ending after the first collision event.

4. The method of claim 1, further comprising receiving, by the server, a request for drone oversight at the location.

5. The method of claim 4, wherein the request is based on at least one of traffic congestion, adverse road conditions, or vehicle system warnings.

6. The method of claim 1, wherein the sensory data is based on a rolling buffer of sensory data.

7. The method of claim 1, wherein the drone is provided with an incentive to enroll in an event monitoring program.

8. The method of claim 7, wherein the server continuously communicates with the drone after the drone enrolls in the event monitoring program.

9. A system, comprising:
at least one processor; and
at least one memory operably coupled to the at least one processor and storing instructions for execution on the at least one processor, the instructions causing the at least one processor to:
receive, from a vehicle at a location, an indication that the location is associated with a high-risk for a vehicle collision, the indication based on sensory data of the vehicle at the location;
determine, based on the determination that the location is associated with a high risk for a vehicle collision, a drone to provide oversight at a location;
dispatch the drone to the location;
request sensory data from the drone in the location; and
receive the sensory data from the drone.

10. The system of claim 9, wherein the sensory data is stored in a buffer of the drone.

11. The system of claim 9, wherein the sensory data comprises at least one of image data, lidar data, radar data, GPS data, or ultrasound data.

12. The system of claim 9, wherein the instructions further cause the processor to receive a request for drone oversight at the location.

13. The system of claim 12, wherein the request is based on at least one of traffic congestion, adverse road conditions, or vehicle system warnings.

14. The system of claim 9, wherein the drone is provided with an incentive to enroll in an event monitoring program.

15. The system of claim 14, wherein the instructions further cause the processor to continuously communicate with the drone after the drone enrolls in the event monitoring program.

16. The system of claim 9, wherein the instructions further cause the processor to receive from the drone a GPS location corresponding thereto.

17. A computer program product comprising a non-transitory computer-readable storage medium having computer-usable program code embodied therein, wherein the computer-usable program code is configured to perform the following when executed by at least one server:
determine a geo-fenced region about a location having a collision event;
recruit a drone within the geo-fenced region to provide oversight at the location;
request, from the drone, sensory data corresponding to the location before, during, and after the collision event; and
receive, from the drone, the sensory data.

18. The computer program product of claim 17, wherein the computer-usable program code is further configured to:
- identify all drones within the geo-fenced region about the location having the collision event; and
- request, from the drones, sensory data corresponding to the location before, during, and after the collision event.

19. The computer program product of claim 17, wherein the computer-usable program code is further configured to:
- receive an indication from a first vehicle at the location that the collision event has occurred;
- identify, based on receiving the indication from the first vehicle, an infrastructure and a second vehicle within the location; and
- request, from the infrastructure and the second vehicle, sensory data corresponding to the location before, during, and after the collision event.

20. The computer program product of claim 17, wherein the computer-usable program code is further configured to:
- send an indication, based on the collision event, for a drone, a vehicle, and an infrastructure in the geo-fenced region to store sensory data to a buffer.

\* \* \* \* \*